United States Patent
Sharifi

(10) Patent No.: US 9,401,146 B2
(45) Date of Patent: Jul. 26, 2016

(54) IDENTIFICATION OF COMMUNICATION-RELATED VOICE COMMANDS

(71) Applicant: Google Inc., Mountain View, CA (US)

(72) Inventor: Matthew Sharifi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 44 days.

(21) Appl. No.: 14/231,968

(22) Filed: Apr. 1, 2014

(65) Prior Publication Data

US 2015/0279365 A1  Oct. 1, 2015

(51) Int. Cl.
*G10L 15/26* (2006.01)
*G10L 15/18* (2013.01)
*H04M 3/42* (2006.01)
*H04M 1/27* (2006.01)
*G10L 15/183* (2013.01)
*G10L 15/22* (2006.01)

(52) U.S. Cl.
CPC ............. *G10L 15/26* (2013.01); *G10L 15/1822* (2013.01); *H04M 3/42204* (2013.01); *G10L 15/183* (2013.01); *G10L 2015/223* (2013.01); *H04M 1/271* (2013.01)

(58) Field of Classification Search
USPC ................................. 704/235, 257, 270, 275
See application file for complete search history.

(56) References Cited

U.S. PATENT DOCUMENTS

| | | | |
|---|---|---|---|
| 5,799,279 A * | 8/1998 | Gould | G10L 15/26 704/231 |
| 7,751,597 B2 | 7/2010 | Gabara | |
| 7,809,563 B2 | 10/2010 | Lee | |
| 8,818,816 B2 | 8/2014 | Inoue et al. | |
| 8,880,400 B2 | 11/2014 | Hanazawa et al. | |
| 2008/0221902 A1* | 9/2008 | Cerra et al. | 704/270.1 |
| 2009/0030680 A1* | 1/2009 | Mamou | G06F 17/30746 704/235 |
| 2012/0191449 A1* | 7/2012 | Lloyd et al. | 704/231 |
| 2013/0166290 A1* | 6/2013 | Suzuki | G10L 15/22 704/231 |

* cited by examiner

*Primary Examiner* — Abul Azad
(74) *Attorney, Agent, or Firm* — Fish & Richardson P.C.

(57) ABSTRACT

Methods, systems, and apparatus, including computer programs encoded on a computer storage medium, for obtaining audio data corresponding to an utterance; transmitting the audio data corresponding to the utterance; receiving an indication that that utterance likely includes a communication-related voice command; in response to receiving the indication that the utterance likely includes the communication-related voice command, applying at least a language model to a representation of the audio data corresponding to the utterance, to identify data referencing a contact; and transmitting the data referencing the contact.

23 Claims, 5 Drawing Sheets

IDENTIFICATION OF COMMUNICATION-RELATED VOICE COMMANDS

FIELD

The present disclosure discusses speech recognition.

BACKGROUND

Spoken utterances may include voice commands, i.e., words that cause a system to perform a corresponding action or actions. A speech recognition service on an electronic device generally receives the spoken utterances and transcribes the utterance into text. To accomplish this, the speech recognition service may attempt to match the sounds of the spoken input with phonetic representations of textual words.

SUMMARY

According to some innovative aspects of the subject matter described in this specification, a communication-related voice command is identified that causes an action to be performed. For example, a user may say "Call Bill" into to a microphone of mobile computing device, with the intent of placing a telephone call to a contact named "Bill." Upon receipt of the utterance, the mobile computing device can transmit audio data associated with the utterance to a server computing system that determines the utterance likely includes a communication-related voice command, e.g., by applying the received audio data to a first language model. The server computing system then transmits an indication that the utterance likely includes a communication-related voice command to the mobile computing device. Upon receipt of the indication, the mobile computing device then applies at least the portion of audio data to a different, second language model to thereby identify that the user spoke the word "Bill." The mobile computing device may then identify a telephone number associated with a contact named "Bill," and may initiate a telephone call using that telephone number.

Innovative aspects of the subject matter described in this specification may be embodied in methods that include the actions of obtaining audio data corresponding to an utterance; obtaining a transcription of the utterance using a first language model; determining that the transcription of the utterance likely includes a communication-related voice command; in response to determining that the transcription of the utterance likely includes the communication-related voice command, applying a second, different language model to a representation of the audio data corresponding to the utterance, to identify data referencing a contact; and causing the communication-related voice command to be performed using the contact.

Other embodiments of these aspects include corresponding systems, apparatus, and computer programs, configured to perform the actions of the methods, encoded on computer storage devices.

These and other embodiments may each optionally include one or more of the following features. For instance, comparing the transcription of the utterance to one or more rules, each rule associated with a particular communication-related voice command; in response to comparing the transcription of the utterance to the one or more rules, determining that the transcription of the utterance satisfies at least one rule of the one or more rules; and in response to determining that the transcription of the utterance satisfies the at least one rule, determining that the transcription of the utterance likely includes the communication-related voice command. Generating an instruction based on i) at least a portion the transcription of the utterance and ii) the data referencing the contact; and in response to generating the instruction, causing the communication-related voice command to be performed. The different language model is trained using a limited vocabulary. The different language model is associated with a speaker of the utterance. The limited vocabulary is associated with one or more contacts names of the user. The data referencing the contact includes at least one of a contact name identifier and contact information associated with the contact.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

In the drawings, like reference symbols indicate like elements throughout.

DETAILED DESCRIPTION

Figure 1:
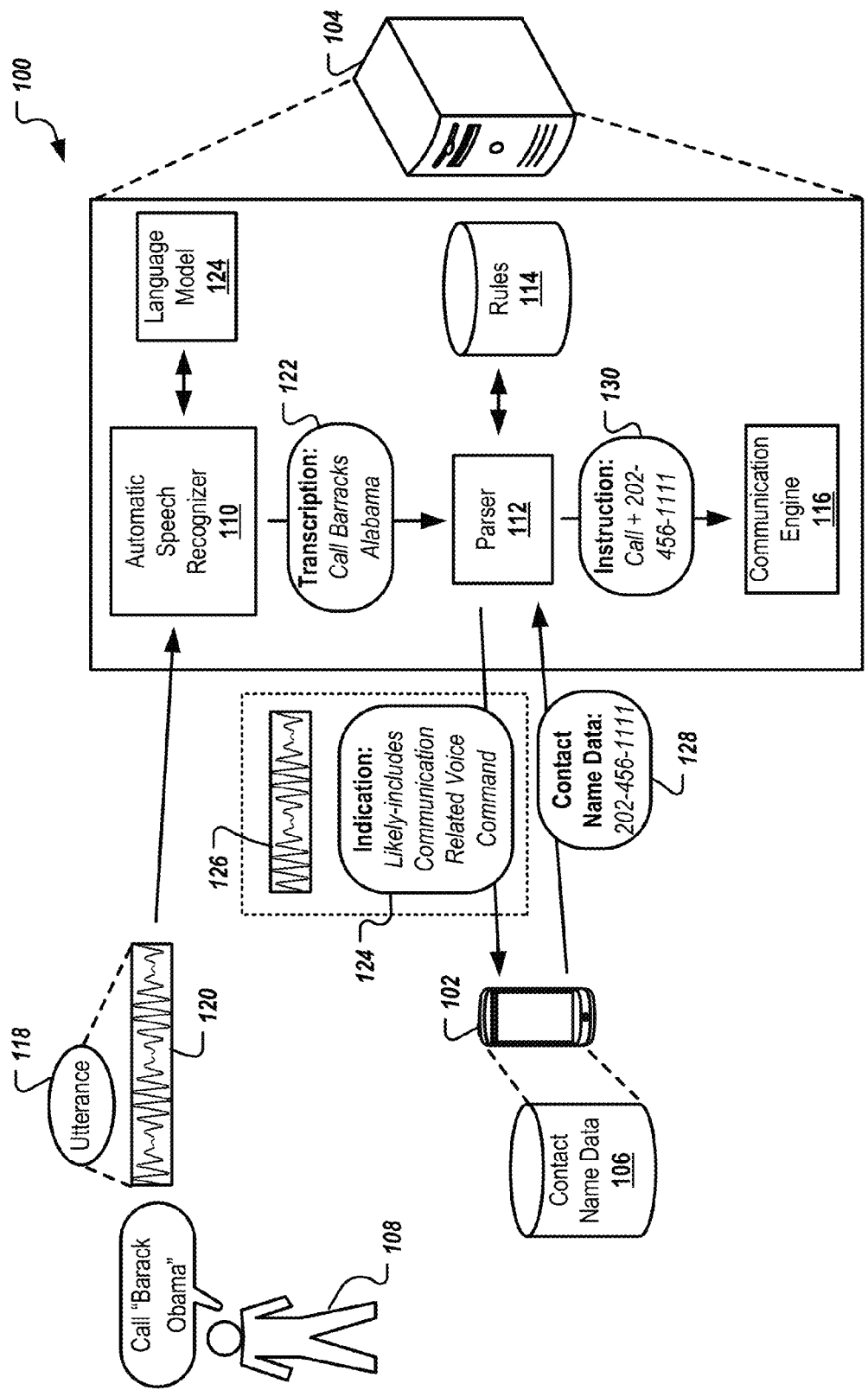
FIGS. 1-3 depict example systems for identifying communication-related voice commands.

FIG. 1 depicts a system 100 for initiating communication based on identifying a communication-related voice command. In some examples, the system 100 includes a client computing device 102 and a server computing system 104. In some examples, the client computing device 102 is a mobile computing device, e.g., a mobile computing device 102. In some examples, the mobile computing device 102 includes a smartphone, a tablet-computing device, or a wearable computing device. The mobile computing device 102 can be in communication with a contact name database 106, and can include any audio detection module, e.g., a microphone, for receiving utterances from a user 108. The server computing system 104 includes an automatic speech recognizer (ASR) 110, a parser 112, a rules database 114, and a communication engine 116. The server computing system 104 is in communication with the mobile computing device 102 over one or more networks.

In some examples, the user 108 says one or more words, e.g., an utterance 118, that the mobile computing device 102 receives. In some examples, the utterance includes a communication-related voice command. As depicted in the illustrated example, the user 108 says "Call Barack Obama." In some examples, the mobile computing device 102 processes the utterance 118 to generate waveform data 120 that includes a portion of the utterance 118, or substantially a whole portion of the utterance 118.

In some examples, the mobile computing device 102 transmits audio data, e.g., the waveform data 120, corresponding to the utterance 118 to the ASR 110. For example, the mobile computing device 102 provides audio data corresponding to the utterance 118 of "Call Barack Obama" to the ASR 110 over one or more networks.

In some examples, the ASR 110 receives the audio data, e.g., the waveform data 120, corresponding to the utterance 118 from the mobile computing device 102. For example, the ASR 110 receives the audio data corresponding to the utterance 118 of "Call Barack Obama" from the mobile computing device 102.

In some examples, the ASR 110 obtains a transcription of the utterance 118 using a first language model. Specifically, the ASR 110 processes the utterance 118 by applying the utterance 118 to a first language model 124 to generate a transcription 122 of the utterance 118. In some examples, the first language model 124 is a "general" or "generic" language model trained on one or more natural languages, e.g., English. That is, in some examples, the first language model 124 is not specific to the user 108, but rather is utilized by a general population of users accessing the server computing system 104. For example, the first language model 124 is trained on and utilized by English speakers that live in the United States of America.

The ASR 110 applies the utterance 118 of "Call Barack Obama" to the first language model 124 to generate the transcription 122 of "Call Barracks Alabama." In some examples, the first language model 124 is not trained with respect to individual names, e.g., "Barack Obama." Thus, the ASR 110 generates a transcription of the portion of the utterance 118 incorrectly, e.g., "Barracks Alabama," or generates a transcription of a portion of the utterance 118 with a low recognition confidence score.

In some examples, the ASR 110 provides the transcription 122 to the parser 112. For example, the ASR 110 provides the transcription 122 of "Call Barracks Alabama" to the parser 112. In some examples, the parser 112 determines that the transcription 122 of the utterance 118 likely includes a communication-related voice command.

The parser 112 may use the rules database 114 in determining whether the transcription 122 of the utterance 118 includes a communication-related voice command, or is associated with a communication-related voice command. Each rule is associated with a particular communication-related voice command. The parser 112 compares some or all of the transcription 122 of the utterance 118 to the rules of the rules database 114. In response to comparing the transcription 122 of the utterance 118 to the rules of the rules database 114, the parser 112 determines whether the transcription 122 of the utterance 118 satisfies at least one rule of the rules database 114, or matches a text pattern associated with a rule.

In some examples, in response to determining that the transcription 122 of the utterance 118 satisfies at least one rule of the rules database 114, the transcription 122 of the utterance 118 is determined to likely include a communication-related voice command. For example, a rule can include that when a transcription includes the word "call," "text" or "e-mail" at an initial portion of the transcription, the transcription likely includes a communication-related voice command. For example, a rule can include that when a transcription includes the words "send message" or "write message" at an initial portion of the transcription, the transcription likely includes a communication-related voice command. For example, a rule can include that when a transcription includes the word "send" at an initial portion of the transcription and the word "text message" or "e-mail" within any portion of the transcription, the transcription likely includes a communication-related voice command. For example, a rule can include that when a transcription includes the word "send" at an initial portion of the transcription and the word "text" or "e-mail" at a final portion of the transcription, the transcription likely includes a communication-related voice command. Additionally, other examples of rules are also possible. In some examples, in response to determining that the transcription 122 of the utterance 118 does not satisfy at least one rule of the rules database 114, the transcription of the utterance 118 is not determined to likely include a communication-related voice command (or determined to not likely include a communication-related voice command).

In the illustrated example, the parser 112 compares the transcription 122 of the utterance 118 to the rules of the rules database 114, and determines that the transcription 122 of "Call Barracks Alabama" includes the word "call" at an initial portion of the transcription 122. Thus, the parser 112 determines that the transcription 122 of the utterance 118 likely includes a communication-related voice command.

In some examples, in response to determining that the transcription 122 of the utterance 118 likely includes the communication-related voice command, the parser 112 transmits an indication 124, e.g., a signal, to the mobile computing device 102, e.g., over one or more networks. The indication 124 indicates that the utterance 118 likely includes a communication-related voice command. In some examples, the parser 112 operates in real-time, e.g., determining whether transcriptions of utterances include communication-related voice commands, as the ASR 110 provides transcriptions to the parser 112.

In some examples, the server computing system 104 can further transmit a portion of the received audio data to the mobile computing device 102. Specifically, the server computing system 104 can extract a portion of the received audio data. For example, the server computing system 104 extracts a portion of the received audio data as a waveform 126. In some examples, the waveform 126 is a portion of the waveform 120.

In some examples, the server computing system 104 determines a specific portion of the audio data to extract. For example, the parser 112 can determine that a portion of the transcription 122 is not an accurate transcription of a corresponding portion of the utterance 118. Specifically, one or more portions of the transcription 122 can be associated with language model scores reflecting a confidence that a respective portion of the transcription 122 is not an accurate transcription of a corresponding portion of the utterance 118. In the illustrated example, the portion of the transcription 122 associated with "Barracks Alabama" may be associated with a language model score below a threshold. That is, the portion of the transcription 122 associated with "Barracks Alabama" is not an accurate transcription of the corresponding portion of the utterance 118, and in particular, the portion of the utterance 118 of "Barack Obama." However, other methods of determining the specific portion of the audio data to extract are possible.

Furthermore, in response to determining that the transcription 122 of the utterance 118 likely includes a communication-related voice command, as determined by the parser 112, the server computing system 104 can transmit, e.g., over one or more networks, the extracted portion of the audio data. For example, the server computing system 104 can transmit the portion of the audio data to the mobile computing device 102 corresponding to the portion of the transcription 122 that is associated with "Barracks Alabama." For example, the waveform 126 can include the audio data corresponding to the portion of the transcription 122 that is associated with "Barracks Alabama."

In some examples, before the server computing system 104 transmits the extracted portion of the audio data, e.g., the waveform 126, to the mobile computing device 102, the server computing system 104 can apply the extracted portion of the audio data to one or more acoustic processing models. For example, the server computing system 104 can apply the extracted portion of the audio data to audio signal processing such as equalization, filtering, noise cancellation, echo or reverb removal or addition, and discrete fourier transform, among other audio signal processing techniques.

In some examples, the mobile computing device 102 receives the indication 124 from the server computing system 104, e.g., over one or more networks. For example, the indication 124 indicates that the utterance 118 likely includes a communication-related voice command. In some examples, the mobile computing device 102 further receives an extracted portion of the audio data, e.g., the waveform 126.

In response to receiving the indication 124 from the server computing system 104, the mobile computing device 102 applies a representation of the audio data corresponding to the utterance, e.g., the waveform 126, to a different, second language model. In the illustrated example, in response to receiving the indication 124, the mobile computing device 102 applies the waveform 126 to the different, second language model to identify data 128 that references a contact. Specifically, the mobile computing device 102 applies the waveform 126 to the different, second language model to obtain a transcription of the utterance 118 that corresponds to the waveform 126. For example, the mobile computing device 102 obtains the transcription of "Barack Obama" that corresponds to the waveform 126.

By applying the waveform 126 to a language model, the mobile computing device 102 identifies data 128 that references a contact that is associated with the user 108. Specifically, the mobile computing device 102 processes the waveform 126 according to the second, different language model to identify the data 128 referencing a contact, described further below with respect to FIGS. 2 and 3. For example, the mobile computing device 102 is in communication with a contact name database 106. The mobile computing device 102 determines that the waveform 126 "matches," based on the different, second language model, at least one of the contact names stored by the contact name database 106, described further below. That is, the contact name database 106 stores mappings between contact names and an output of the language model, e.g., a sequence of phones, or language model scores.

In some examples, based on the transcription of "Barack Obama" that corresponds to the waveform 126, the mobile computing device 102 identifies a mapping stored by the contact name database 106 between the transcription of "Barack Obama" and the data 128. Specifically, the mobile computing device 102 identifies the data 128 of a phone number associated with the contact corresponding to the transcription of "Barack Obama" as "202-456-1111."

In some examples, the different, second language model is trained using a limited vocabulary. For example, the limited vocabulary is associated with the user 108, and more specifically, is associated with contact names of the user, e.g., as stored by the contact name database 106. That is, the different, second language model is trained based on contact names associated the user 108 that are stored by the contact name database 106. Thus, in some examples, the different, second language model is specific to the user 108, and more particularly, is specific to the contact names associated with the user 108. In some examples, the data referencing the contact includes a contact name identifier, e.g., a name, or an ID number associated with the contact name; or contact information associated with the contact, e.g., a phone number or e-mail address, or other data.

In some examples, the mobile computing device 102 transmits the data 128 referencing the contact to the server computing system 104, e.g., over one or more networks. For example, the mobile computing device 102 transmits the phone number "202-456-1111" associated with the contact corresponding to the transcription of "Barack Obama" to the server computing system 104.

In some examples, the server computing device 102, and specifically, the parser 112, receives the data 128 referencing the contact, e.g., over one or more networks. For example, the parser 112 receives the phone number "202-456-1111" that is associated with the contact corresponding to the transcription of "Barack Obama."

In some examples, the parser 112 causes the communication-related voice command to be performed using the data 128 referencing the contact. For example, the parser 112 generates an instruction 130 that is transmitted to the communication engine 116. The communication engine 116 causes the communication-related voice command to be performed. In some examples, the communication-related voice command is performed by the mobile computing device 102, the server computing system 104, or a combination of both. In some examples, the instruction is further based on a portion of the transcription 122 of the utterance 118 and the data 128 referencing the contact.

In the illustrated example, the instruction 130 is based on a portion of the transcription 122 of "Call" and the phone number "202-456-1111" of the data 128. Specifically, the communication-related voice command relates to initiating a telephone call to the number "202-456-1111." The communication engine 116 initiates a telephone call to the number "202-456-1111." Furthermore, as shown, in response to initiating the telephone call to the number "202-456-1111" by the communication engine 116, the mobile computing device 102 establishes a telephonic connection with a third-party telephonic device (not shown) associated with the number "202-456-1111" and further generates an audible message of "White House, how may I help you?" that is provided by the third-party telephonic device.

Figure 2:
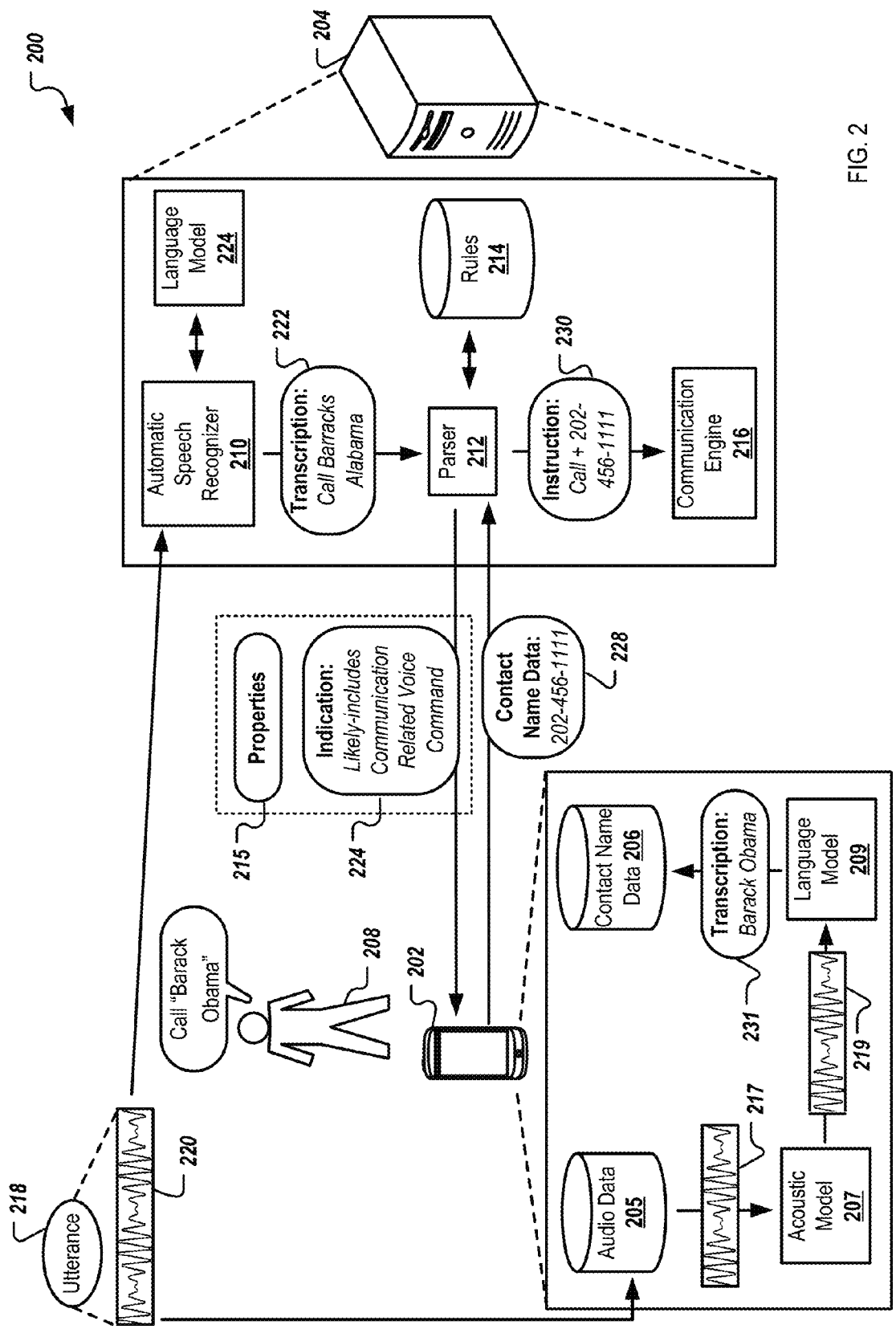

FIG. 2 depicts a system 200 for initiating communication based on identifying a communication-related voice command. In some examples, the system 200 includes a client computing device 202 and a server computing system 204. In some examples, the client computing device 202 is a mobile computing device, e.g., a mobile computing device 202. In some examples, the mobile computing device 202 includes a smartphone, a tablet-computing device, or a wearable computing device. The mobile computing device 202 includes an audio database 205, a contact name database 206, an acoustic model 207, and a language model 209. Additionally, the mobile computing device 202 can include any audio detection module, e.g., a microphone, for receiving utterances from a user 208. Similar to that mentioned above with respect to the server computing system 104, the server computing system 204 includes an automatic speech recognizer (ASR) 210, a parser 212, a rules database 214, and a communication engine 216. The server computing system 204 is in communication with the mobile computing device 202 over one or more networks.

In some examples, the user 208 says one or more words, e.g., an utterance 218, that the mobile computing device 202 receives. In some examples, the utterance includes a communication-related voice command. As depicted in the illustrated example, the user 208 says "Call Barack Obama." In some examples, the mobile computing device 202 processes the utterance 218 to generate waveform data 220 that includes a portion of the utterance, or substantially a whole portion of the utterance.

In some examples, the mobile computing device 202 stores at least a portion of the audio data, e.g., the waveform data 220, corresponding to the utterance 218. For example, the audio database 205 of the mobile computing device 202 stores at least a portion of the waveform 220 corresponding to the utterance 218. In some examples, the waveform data 220 includes properties, or features, associated with the utterance 218.

In some examples, the mobile computing device 202 transmits audio data, e.g., the waveform data 220, corresponding to the utterance 218 to the ASR 210. For example, the mobile computing device 202 provides audio data corresponding to the utterance 218 of "Call Barack Obama" to the ASR 210 over one or more networks.

In some examples, the ASR 210 receives the audio data, e.g., the waveform data 220, corresponding to the utterance 218 from the mobile computing device 202. For example, the ASR 210 receives the audio corresponding to the utterance 218 of "Call Barack Obama" from the mobile computing device 202.

In some examples, the ASR 210 obtains a transcription of the utterance 218 using a first language model. Specifically, the ASR 210 processes the utterance 218 by applying the utterance 218 to a first language model 224 to generate a transcription 222. In some examples, the first language model 224 is a "general" or "generic" language model trained on one or more natural languages, e.g., English. That is, in some examples, the first language model 224 is not specific to the user 208, but rather is utilized by a general population of users accessing the server computing system 204.

The ASR 210 processes the utterance 218 of "Call Barack Obama" to generate the transcription 222 of "Call Barracks Obama." In some examples, the first language model 224 is not trained with respect to individual names, e.g., "Barack Obama." Thus, the ASR 210 generates a transcription of the portion of the utterance 218 incorrectly, e.g., "Barracks Alabama," or generate a transcription of a portion of the utterance 218 with a low recognition confidence score.

In some examples, the ASR 210 provides the transcription 222 to the parser 212. For example, the ASR 210 provides the transcription 222 of "Call Barracks Alabama" to the parser 212. The parser 212 determines that the transcription 222 of the utterance 218 likely includes a communication-related voice command.

The parser 212 is in communication with the rules database 214 to determine whether the transcription 222 of the utterance 218 includes a communication-related voice command. Each rule is associated with a particular communication-related voice command. The parser 212 compares the transcription 222 of the utterance 218 to the rules of the rules database 214. In response to comparing the transcription 222 of the utterance 218 to the rules of the rules database 214, the parser 212 determines whether the transcription 222 of the utterance 218 satisfies at least one rule of the rules database 214, or matches a text pattern associated with a rule.

In some examples, in response to determining that the transcription 222 of the utterance 218 satisfies at least one rule of the rules database 214, the transcription 222 of the utterance 218 is determined to likely include a communication-related voice command. For example, a rule can include that when a transcription includes the word "call," "text" or "e-mail" at an initial portion of the transcription, the transcription likely includes a communication-related voice command. For example, a rule can include that when a transcription includes the words "send message" or "write message" at an initial portion of the transcription, the transcription likely includes a communication-related voice command. For example, a rule can include that when a transcription includes the word "send" at an initial portion of the transcription and the word "text message" or "e-mail" within any portion of the transcription, the transcription likely includes a communication-related voice command. For example, a rule can include that when a transcription includes the word "send" at an initial portion of the transcription and the word "text" or "e-mail" at a final portion of the transcription, the transcription likely includes a communication-related voice command. Additionally, other examples of rules are also possible. In some examples, in response to determining that the transcription 222 of the utterance 218 does not satisfy at least one rule of the rules database 214, the transcription of the utterance is not determined to likely include a communication-related voice command (or determined to not likely include a communication-related voice command).

In the illustrated example, the parser 212 compares the transcription 222 of the utterance 218 to the rules of the rules database 214, and determines that the transcription 222 of "Call Barracks Alabama" includes the word "call" at an initial portion of the transcription 222. Thus, the parser 212 determines that the transcription 222 of the utterance 218 likely includes a communication-related voice command.

In some examples, in response to determining that the transcription 222 of the utterance 218 likely includes the communication-related voice command, the parser 212 transmits an indication 224, e.g., a signal, to the mobile computing device 202, e.g., over one or more networks. The indication 224 indicates that the utterance 218 likely includes a communication-related voice command.

In some examples, the server computing system 202 identifies properties 215 associated with the received audio data, e.g., the waveform 220, or a portion of the received audio data. In some examples, the portion of the audio data corresponds to a portion of the transcription 222 that is not an accurate transcription of a corresponding portion of the utterance 218. In the illustrated example, the portion of the transcription 222 associated with "Barracks Alabama" is not an accurate transcription of the corresponding portion of the utterance 218, and in particular, the portion of the utterance 218 of "Barack Obama." Thus, the properties 215 are associated with the portion of the audio data corresponding to the portion of the transcription 222 associated with "Barracks Alabama." Additionally, the server computing system 202 can transmit the properties 215 to the mobile computing device 202.

In some examples, the properties 215 can include a sequence of phones of the audio data, or the portion of the audio data corresponding to the portion of the transcription 222 that does not substantially correspond to the utterance 218. For example, the properties 215 can include a sequence of phones corresponding to the portion of the transcription 222 that is associated with "Barracks Alabama." In some examples, the properties 215 can include language model scores of the portion of the audio data. For example, the properties 215 can include language model scores corresponding to the portion of the transcription 222 that is associated with "Barracks Alabama." In some examples, the properties 215 can include one or more timestamps of the portion of the transcription 222 that is associated with "Barracks Alabama." For example, the timestamps can be associated with a beginning and an ending time of the portion of the transcription 222 that is associated with "Barracks Alabama." In some examples, the properties 215 can include a combination of the sequence of phones, language model scores, and timestamps of the portion of the audio data corresponding to the portion of the transcription 222 that does not substantially correspond to the utterance 218.

In some examples, in response to determining that the transcription 222 of the utterance 218 likely includes the communication-related voice command, the parser 212 transmits the properties 215 to the mobile computing device 202, e.g., over one or more networks. For example, the properties 215 can include one or more of the sequence of phones, the acoustic model scores, and timestamps of the portion of the audio data corresponding to the portion of the transcription 222 that does not substantially correspond to the utterance 218.

In some examples, the mobile computing device 202 receives the indication 224 from the server computing system 204. For example, the indication 224 indicates that the utterance 218 likely includes a communication-related voice command. In some examples, the mobile computing device 202 further receives the properties 215 from the server computing system 204. For example, the mobile computing device 202 receives timestamps associated of the portion of the audio data corresponding to the portion of the transcription 222 that is not an accurate transcription of a corresponding portion of the utterance 218.

In response to receiving the indication 224, and the properties 215 from the server computing system 204, the mobile computing device 202 applies a representation of the audio data corresponding to the utterance 218 to a different, second language model. Specifically, the mobile computing device 202 identifies audio data that is associated with the utterance 218 and is stored by the audio database 205. That is, the mobile computing device 202 identifies a stored version of the waveform 220, or a stored portion of the waveform 220. In some examples, the mobile computing device 202 identifies the stored audio data that is associated with the utterance 218 in view of the properties 215. For example, the properties 215 can indicate a particular waveform, of multiple stored waveforms, for retrieval by the mobile computing device 202. In some examples, the mobile computing device 202 identifies the stored version of the waveform 220 automatically, or in response to a query.

In some examples, the mobile computing device 202 generates the representation of the audio data based on the stored portion of the audio data. Specifically, the mobile computing device 202 generates the representation of the audio data based on a stored portion of the waveform 220. The mobile computing device 202 extracts a portion of the stored version of the waveform 220 corresponding to the utterance 218. For example, the mobile computing device 202 extracts a portion of the stored version of the waveform 220 corresponding to the utterance 218 as a waveform 217. In some examples, the waveform data 217 includes properties, or features, associated with the utterance 218.

In some examples, the mobile computing device 202 determines a specific portion of the stored version of the waveform 220 to extract based on the properties 215. For example, the properties 215 can include one or more timestamps associated with the stored version of the waveform 120. Thus, the mobile computing device 202 can identify a portion of the stored version of the waveform 220 that is defined based on the timestamps, e.g., a portion of the stored version of the waveform 220 that is defined between the timestamps. For example, the timestamps can correspond to a portion of the stored version of the waveform 220 that corresponds to the portion of the transcription 222 that is not accurate transcription of a portion of the utterance 218. For example, the corresponding portion of the transcription 222 can be associated with language model scores reflecting a confidence that a respective portion of the transcription 222 is not an accurate transcription of the portion of the utterance 218. In the illustrated example, the portion of the transcription 222 associated with "Barracks Alabama" may be associated with a language model score below a threshold. That is, the portion of the transcription 222 associated with "Barracks Alabama" is not an accurate transcription of the corresponding portion of the utterance 218, and in particular, the portion of the utterance 218 of "Barack Obama." Thus, the parser 212 identifies corresponding timestamps associated with the portion of the transcription 222 associated with "Barracks Alabama" and includes such in the properties 215. Thus, the mobile computing device 202 can identify the corresponding portion of the stored version of the waveform 220 based on the provided timestamps, e.g., the waveform 217.

In some examples, the mobile computing device 202 determines the specific portion of the stored version of the waveform 220 to extract based on other properties of the properties 215, including the sequence of phones, acoustic model scores, or a combination thereof, including the timestamps.

In some examples, the mobile computing device 202 can apply the waveform 217 to one or more acoustic processing models to generate a waveform 219. For example, the mobile computing device 202 can apply the waveform 217 to the acoustic model 207 such as equalization, filtering, noise cancellation, echo or reverb removal or addition, and discrete fourier transform, among other audio signal processing techniques, to generate the processed waveform 219.

In some examples, the mobile computing device 202 applies the waveform 219 to language model 209 to generate a transcription 231. For example, the mobile computing device 202 obtains the transcription 231 of "Barack Obama" that corresponds to the waveform 219 based on the language model 209.

In some examples, the language model 209 is a differing, second language model as compared to the language model 224. In some examples, the different, second language model 209 is trained using a limited vocabulary. For example, the limited vocabulary is associated with the user 208, and more specifically, is associated with contact names of the user, e.g., as stored by the contact name database 206. That is, the different, second language model 209 is trained based on contact names associated the user 208 that are stored by the contact name database 206. Thus, in some examples, the different, second language model 209 is specific to the user 208, and more particularly, is specific to the contact names associated with the user 208.

In some examples, based on the transcription of "Barack Obama" that corresponds to the waveform 219, the mobile computing device 202 identifies a mapping stored by the contact name database 206 between the transcription 231 of "Barack Obama" and data 228 that references a contact that is associated with the user 208. Specifically, the mobile computing device 202 determines that the transcription 231 "matches" at least one of the contact names stored by the contact name database 206. That is, the contact name database 206 stores mappings between contact names and transcriptions of utterances. In some examples, the data 228 referencing the contact includes a contact name identifier, e.g., a name, or an ID number associated with the contact name; or contact information associated with the contact, e.g., a phone number or e-mail address, or other data.

In some examples, based on the transcription 231 of "Barack Obama" that corresponds to the waveform 219, the mobile computing device 202 identifies a mapping stored by the contact name database 206 between the transcription 231 of "Barack Obama" and the data 228. Specifically, the mobile computing device 202 identifies the data 228 of a phone number associated with the contact corresponding to the transcription 231 of "Barack Obama" as "202-456-1111."

In some examples, the mobile computing device 202 transmits the data 228 referencing the contact to the server computing system 204, e.g., over one or more networks. For example, the mobile computing device 202 transmits the phone number "202-456-1111" associated with the contact corresponding to the transcription 231 of "Barack Obama" to the server computing system 204.

In some examples, the server computing device 202, and specifically, the parser 212, receives the data 228 referencing the contact, e.g., over one or more networks. For example, the parser 212 receives the phone number "202-456-1111" that is associated with the contact corresponding to the transcription 231 of "Barack Obama."

In some examples, the parser 212 causes the communication-related voice command to be performed using the data 228 referencing the contact. For example, the parser 212 generates an instruction 230 that is transmitted to the communication engine 216. The communication engine 216 causes the communication-related voice command to be performed. In some examples, the communication-related voice command is performed by the mobile computing device 202, the server computing system 204, or a combination of both. In some examples, the instruction 230 is further based on a portion of the transcription 222 of the utterance 218 and the data 228 referencing the contact.

In the illustrated example, the instruction 230 is based on a portion of the transcription 222 of "Call" and the phone number "202-456-1111" of the data 228. Specifically, the communication-related voice command relates to initiating a telephone-call to the number "202-456-1111." The communication engine 216 initiates a telephone call to the number "202-456-1111." Furthermore, as shown, in response to initiating the telephone-call to the number "202-456-1111" by the communication engine 216, the mobile computing device 202 establishes a telephonic connection with a third-party telephonic device (not shown) associated with the number "202-456-1111" and further generates an audible message of "White House, how may I help you" that is provided by the third-party telephonic device.

Figure 3:
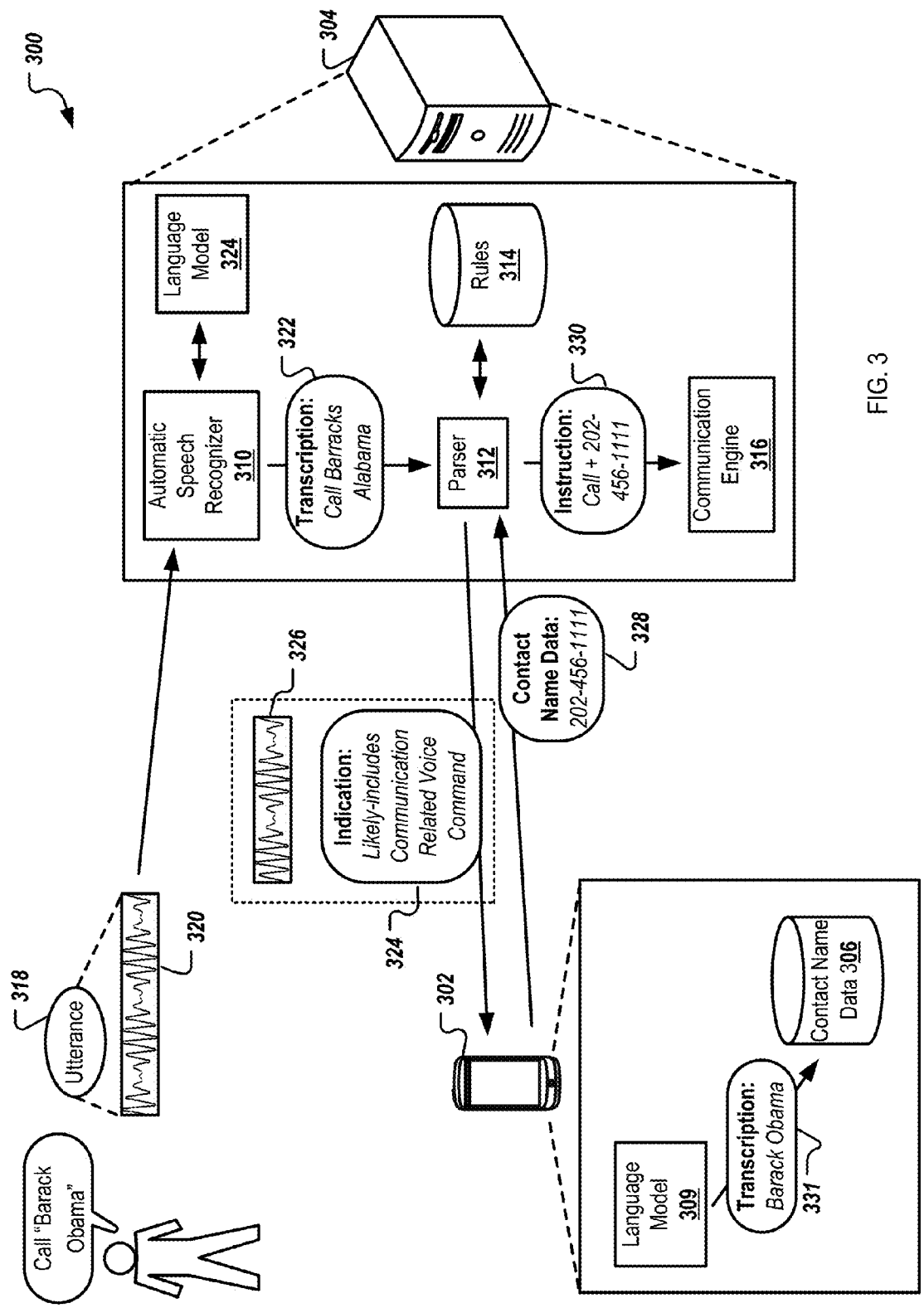

FIG. 3 depicts a system 300 for initiating communication based on identifying a communication-related voice command. In some examples, the system 300 includes a client computing device 302 and a server computing system 304. In some examples, the client computing device 302 is a mobile computing device, e.g., a mobile computing device 302. In some examples, the mobile computing device 302 includes a smartphone, a tablet-computing device, or a wearable computing device. The mobile computing device 302 can include a contact name database 306, a language model 309, and any audio detection module, e.g., a microphone, for receiving utterances from a user 308. The server computing system 304, similar to the server computing system 104 of FIG. 1, includes an automatic speech recognizer (ASR) 310, a parser 312, a rules database 314, and a communication engine 316. The server computing system 304 is in communication with the mobile computing device 302 over one or more networks.

In some examples, the user 308 says one or more words, e.g., an utterance 318, that the mobile computing device 302 receives. In some examples, the utterance includes a communication-related voice command. As depicted in the illustrated example, the user 308 says "Call Barack Obama." In some examples, the mobile computing device 302 processes the utterance 318 to generate waveform data 320 that includes a portion of the utterance 318, or substantially a whole portion of the utterance.

In some examples, the mobile computing device 302 transmits audio data, e.g., the waveform data 320, corresponding to the utterance 318 to the ASR 310. For example, the mobile computing device 302 provides audio data corresponding to the utterance "Call Barack Obama" to the ASR 310 over one or more networks.

In some examples, the ASR 310 receives the audio data, e.g., the waveform data 320, corresponding to the utterance 320 from the mobile computing device 302. For example, the ASR 310 receives the audio corresponding to the utterance "Call Barack Obama" from the mobile computing device 302.

In some examples, the ASR 310 obtains a transcription of the utterance 318 using a first language model. Specifically, the ASR 310 processes the utterance 318 by applying the utterance 318 to a first language model 324 to generate a transcription 322. In some examples, the language model 324 is a "general" or "generic" language model trained on one or more natural languages, e.g., English. That is, in some examples, the language model 324 is not specific to the user 308, but rather is utilized by a general population of users accessing the server computing system 304.

The ASR 310 processes the utterance 318 of "Call Barack Obama" to generate the transcription 322 of "Call Barracks Alabama." In some examples, the language model 324 is not trained with respect to individual names, e.g., "Barack Obama." Thus, the ASR 310 generates a transcription of the portion of the utterance 318 incorrectly, e.g., "Barracks Alabama," or generates a transcription of a portion of the utterance 318 with a low recognition confidence score.

In some examples, the ASR 310 provides the transcription 322 to the parser 312. For example, the ASR 310 provides the transcription 322 of "Call Barracks Alabama" to the parser 312. The parser 312 determines that the transcription 322 of the utterance 318 likely includes a communication-related voice command.

The parser 312 is in communication with the rules database 314 to determine whether the transcription 322 of the utterance 318 includes a communication-related voice command. Each rule is associated with a particular communication-related voice command. The parser 312 compares the transcription 322 of the utterance 318 to the rules of the rules database 314. In response to comparing the transcription 322 of the utterance 318 to the rules of the rules database 314, the parser 312 determines whether the transcription 322 of the utterance 318 satisfies at least one rule of the rules database 314, or matches a text pattern associated with a rule.

In some examples, in response to determining that the transcription 322 of the utterance 318 satisfies at least one rule of the rules database 314, the transcription 322 of the utterance 318 is determined to likely include a communication-related voice command. For example, a rule can include that when a transcription includes the word "call," "text" or "e-mail" at an initial portion of the transcription, the transcription likely includes a communication-related voice command. For example, a rule can include that when a transcription includes the words "send message" or "write message" at an initial portion of the transcription, the transcription likely includes a communication-related voice command. For example, a rule can include that when a transcription includes the word "send" at an initial portion of the transcription and the word "text message" or "e-mail" within any portion of the transcription, the transcription likely includes a communication-related voice command. For example, a rule can include that when a transcription includes the word "send" at an initial portion of the transcription and the word "text" or "e-mail" at a final portion of the transcription, the transcription likely includes a communication-related voice command. Additionally, other examples of rules are also possible. In some examples, in response to determining that the transcription 322 of the utterance 318 does not satisfy at least one rule of the rules database 314, the transcription of the utterance is not determined to likely include a communication-related voice command (or determined to not likely include a communication-related voice command).

In the illustrated example, the parser 312 compares the transcription 322 of the utterance 318 to the rules of the rules database 314, and determines that the transcription 322 of "Call Barracks Alabama" includes the word "call" at an initial portion of the transcription 322. Thus, the parser 312 determines that the transcription 322 of the utterance 318 likely includes a communication-related voice command.

In some examples, in response to determining that the transcription 322 of the utterance 318 likely includes the communication-related voice command, the parser 312 transmits an indication 324, e.g., a signal, to the mobile computing device 302, e.g., over one or more networks. The indication 324 indicates that the utterance 318 likely includes a communication-related voice command.

In some examples, the server computing system 304 can further transmit a portion of the received audio data to the mobile computing device 302. Specifically, the server computing system 304 can extract a portion of the audio data corresponding to the utterance 318. For example, the server computing system 304 extracts a portion of the audio data corresponding to the utterance 318 as a waveform 326. In some examples, the waveform 326 is a portion of the waveform 320.

In some examples, the server computing system 304 determines a specific portion of the audio data to extract. For example, the parser 312 can determine that a portion of the transcription 322 is not an accurate transcription of a corresponding portion of the utterance 318. Specifically, one or more portions of the transcription 322 can be associated with language model scores reflecting a confidence that a respective portion of the transcription 322 is not an accurate transcription of a corresponding portion of the utterance 318. In the illustrated example, the portion of the transcription 322 associated with "Barracks Alabama" may be associated with a language model score below a threshold. That is, the portion of the transcription 322 associated with "Barracks Alabama" is not an accurate transcription of the corresponding portion of the utterance 318, and in particular, the portion of the utterance 318 of "Barack Obama." However, other methods of determining the specific portion of the audio data to extract are possible.

Furthermore, in response to determining that the transcription 322 of the utterance 318 likely includes a communication-related voice command, as determined by the parser 312, the server computing system 304 can transmit, e.g., over one or more networks, the extracted portion of the audio data. For example, the server computing system 304 can transmit the portion of the audio data to the mobile computing device 302 corresponding to the portion of the transcription 322 that is associated with "Barracks Alabama." For example, the waveform 326 can include the audio data corresponding to the portion of the transcription 322 that is associated with "Barracks Alabama."

In some examples, before the server computing system 304 transmits the extracted portion of the audio data, e.g., the waveform 326, to the mobile computing device 302, the server computing system 304 can apply the extracted portion of the audio data to the one or more acoustic processing models. For example, the server computing system 304 can apply the extracted portion of the audio data to audio signal processing such as equalization, filtering, noise cancellation, echo or reverb removal or addition, among other audio signal processing techniques.

In some examples, the mobile computing device 302 receives the indication 324, from the server computing system 304. For example, the indication 324 indicates that the utterance 318 likely includes a communication-related voice command. In some examples, the mobile computing device 302 further receives an extracted portion of the audio data, e.g., the waveform 326.

In response to receiving the indication 324, from the server computing system 304, the mobile computing device 302 applies a representation of the audio data corresponding to the utterance, e.g., the waveform 326, to a different, second language model to generate a transcription 331. For example, the mobile computing device 302 obtains the transcription 331 of "Barack Obama" that corresponds to the waveform 326 based on the language model 309.

In some examples, the language model 309 is a differing, second language model as compared to the language model 324. In some examples, the different, second language model 309 is trained using a limited vocabulary. For example, the limited vocabulary is associated with the user 308, and more specifically, is associated with contact names of the user, e.g., as stored by the contact name database 306. That is, the different, second language model 309 is trained based on contact names associated with the user 308 that are stored by the contact name database 306. Thus, in some examples, the different, second language model 309 is specific to the user 308, and more particularly, is specific to the contact names associated with the user 308.

In some examples, based on the transcription 331 of "Barack Obama" that corresponds to the waveform 326, the mobile computing device 302 identifies a mapping stored by the contact name database 306 between the transcription 331 of "Barack Obama" and data 328 that references a contact that is associated with the user 308. Specifically, the mobile computing device 302 determines that the waveform 326 "matches" at least one of the contact names stored by the contact name database 306. That is, the contact name database 306 stores mappings between contact names and transcriptions of utterances. In some examples, the data referencing the contact includes a contact name identifier, e.g., a name; or an ID number associated with the contact name, contact information associated with the contact, e.g., a phone number or e-mail address, or other data.

In some examples, based on the transcription 331 of "Barack Obama" that corresponds to the waveform 326, the mobile computing device 302 identifies a mapping stored by the contact name database 306 between the transcription 331 of "Barack Obama" and the data 328. Specifically, the mobile computing device 302 identifies the data 328 of a phone number associated with the contact corresponding to the transcription 331 of "Barack Obama" as "202-456-1111."

In some examples, the mobile computing device 302 transmits the data 328 referencing the contact to the server computing system 304, e.g., over one or more networks. For example, the mobile computing device 302 transmits the phone number "202-456-1111" associated with the contact corresponding to the transcription 331 of "Barack Obama" to the server computing system 304

In some examples, the server computing device 302, and specifically, the parser 312, receives the data 328 referencing the contact, e.g., over one or more networks. For example, the parser 312 receives the phone number "202-456-1111" that is associated with the contact corresponding to the transcription 331 of "Barack Obama."

In some examples, the parser 312 causes the communication-related voice command to be performed using the data 328 referencing the contact. For example, the parser 312 generates an instruction 330 that is transmitted to the communication engine 316. The communication engine 316 causes the communication-related voice command to be performed. In some examples, the communication-related voice command is performed by the mobile computing device 302, the server computing system 304, or a combination of both. In some examples, the instruction is further based on a portion of the transcription 322 of the utterance 318 and the data 328 referencing the contact.

In the illustrated example, the instruction 330 is based on a portion of the transcription 322 of "Call" and the phone number "202-456-1111" of the data 328. Specifically, the communication-related voice command relates to initiating a telephone call to the number "202-456-1111." The communication engine 316 initiates a telephone call to the number "202-456-1111." Furthermore, as shown, in response to initiating the telephone-call to the number "202-456-1111" by the communication engine 316, the mobile computing device 302 establishes a telephonic connection with a third-party telephonic device (not shown) associated with the number "202-456-1111" and further generates an audible message of "White House, how may I help you?" that is provided by the third-party telephonic device.

Figure 4:
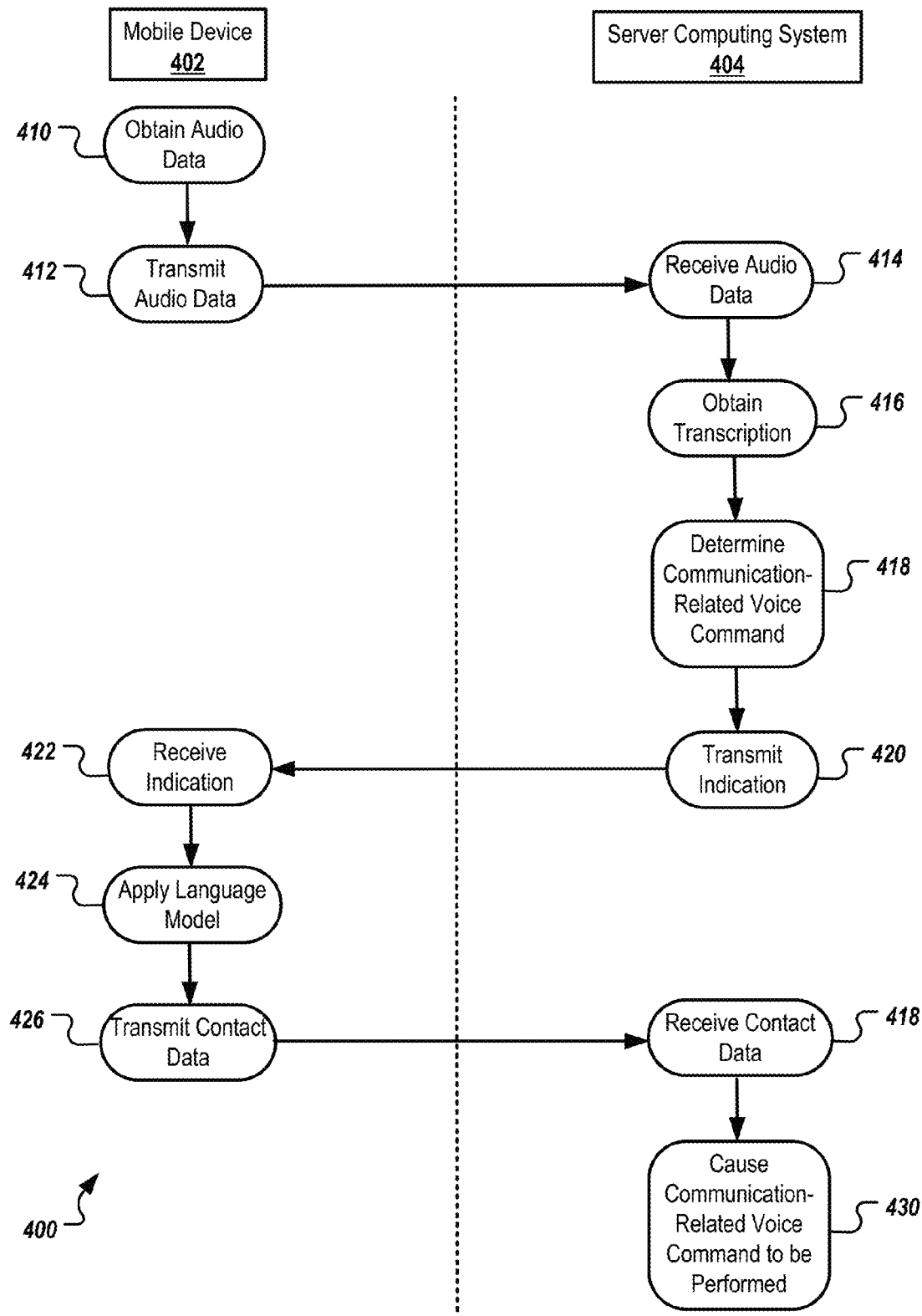
FIG. 4 depicts a swim-lane diagram for identifying communication-related voice commands.

FIG. 4 is a swim-lane diagram 400 for identifying of communication-related voice commands between a mobile computing device 402 and a server computing system 404. In some examples, the mobile computing device 402 can include the mobile computing device 102 of FIG. 1, the mobile computing device 202 of FIG. 2, or the mobile computing device 302 of FIG. 3. In some examples, the server computing system 404 can include the server computing system 104 of FIG. 1, the server computing system 204 of FIG. 2, or the mobile computing device 404 of FIG. 4.

At stage 410, the mobile computing device 402 obtains audio data corresponding to an utterance. At stage 412, the mobile computing device 102 transmits audio data corresponding to the utterance to the server computing system 404. At stage 414, the server computing system 404 receives the audio data corresponding to the utterance. At stage 416, the server computing system 402 obtains a transcription of the utterance using a first language model. At stage 418, the server computing system 404 determines that the transcription of the utterance likely includes a communication-related voice command. At stage 420, in response to determining that the transcription of the utterance likely includes the communication-related voice command, the server computing system 404 transmits an indication to the mobile computing device 402 that the utterance likely includes the communication-related voice command. At stage 422, the mobile computing device 402 receives the indication that the utterance likely includes the communication-related voice command. At stage 424, in response to receiving the indication that the utterance likely includes the communication-related voice command, the mobile computing device 102 applies a different, second language model to a representation of the audio data corresponding to the utterance, to identify data reference a contact. At stage 426, the mobile computing device 402 transmits the data reference the contact to the server computing system 404. At stage 428, the server computing system 404 receives the data referencing the contact. At stage 430, the server computing system 404 causes the communication-related voice command to be performed using the data referencing the contact.

Figure 5:
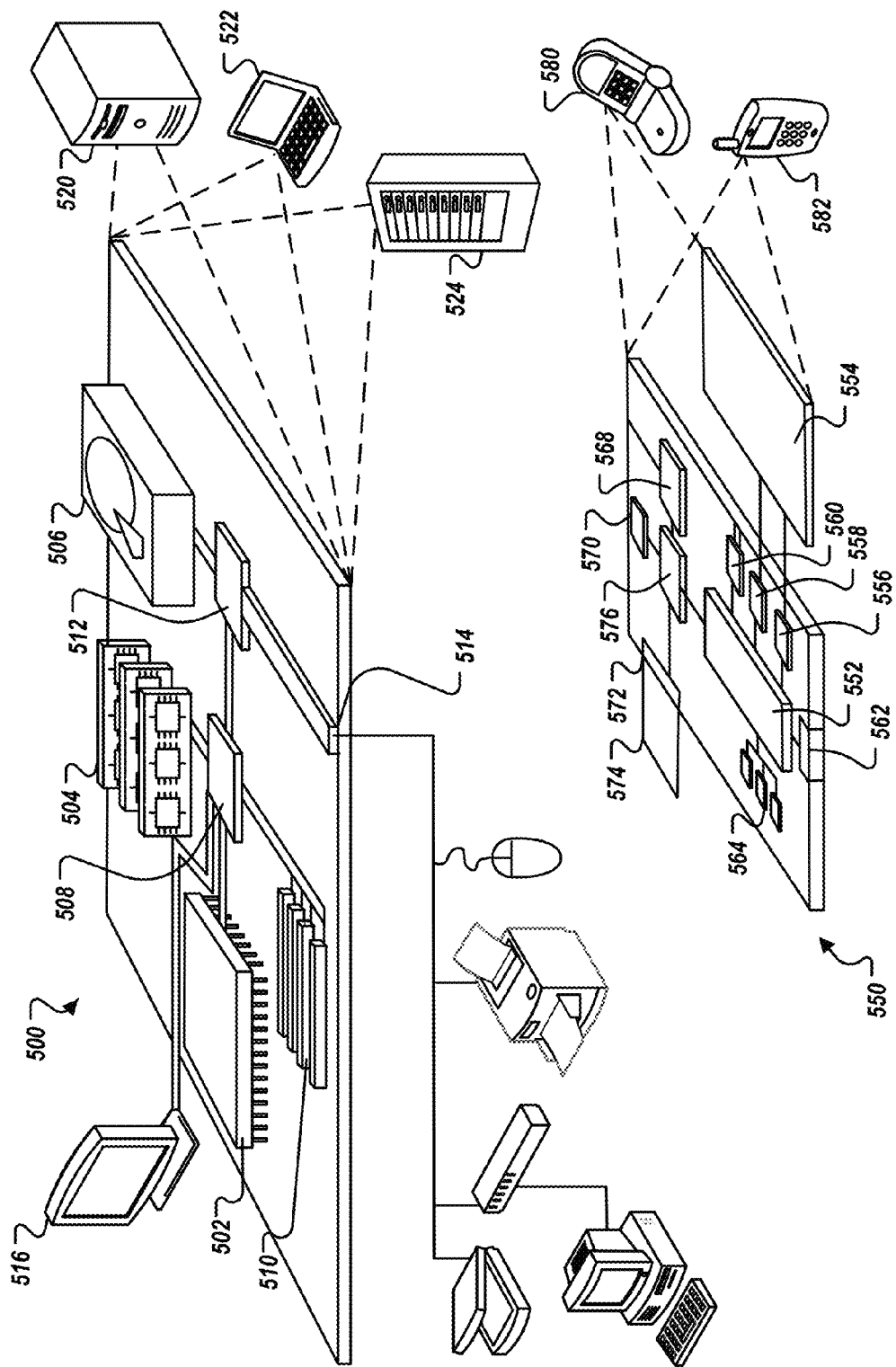
FIG. 5 depicts a computer device and a mobile computer device that may be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 648 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
  obtaining audio data corresponding to an utterance;
  obtaining a transcription of the utterance using a first language model;
  determining that the transcription of the utterance obtained using the first language model likely includes a communication-related voice command;
  in response to determining that the transcription of the utterance obtained using the first language model likely includes the communication-related voice command, selecting a subset of the audio data that corresponds to a portion of the utterance referencing a contact associated with the communication-related voice command;
  obtaining a transcription of the portion of the utterance using a second, different language model reapplied to the subset of the audio data that corresponds to the portion of the utterance referencing a contact associated with the communication-related voice command;
  identifying data associated with a particular contact that corresponds to the transcription of the portion of the utterance; and
  causing the communication-related voice command to be performed using the data associated with the particular contact.

2. The method of claim 1, comprising:
  comparing the transcription of the utterance to one or more rules, each rule associated with a particular communication-related voice command;
  in response to comparing the transcription of the utterance to the one or more rules, determining that the transcription of the utterance satisfies at least one rule of the one or more rules; and
  in response to determining that the transcription of the utterance satisfies the at least one rule, determining that the transcription of the utterance likely includes the communication-related voice command.

3. The method of claim 1, comprising:
  generating an instruction based on i) the transcription of the portion of the utterance and ii) the data associated with the particular contact; and
  in response to generating the instruction, causing the communication-related voice command to be performed.

4. The method of claim 1, wherein the different language model is trained using a limited vocabulary.

5. The method of claim 4, wherein the different language model is associated with a speaker of the utterance.

6. The method of claim 5, wherein the limited vocabulary is associated with one or more contacts names of the user.

7. The method of claim 1, wherein the data associated with the particular contact includes at least one of a contact name identifier and contact information associated with the particular contact.

8. A computer-implemented method comprising:
  receiving audio data corresponding to an utterance;
  obtaining a transcription of the utterance using a language model;
  determining that the transcription of the utterance likely includes a communication-related voice command;
  in response to determining that the transcription of the utterance likely includes the communication-related voice command, selecting a subset of the audio data that corresponds to a portion of the utterance referencing a contact associated with the communication-related voice command;

transmitting an indication that the utterance likely includes the communication-related voice command and the subset of the audio data that corresponds to the portion of the utterance;

in response to transmitting the indication that the utterance likely includes the communication-related voice command and the subset of the audio data that corresponds to the portion of the utterance, receiving data associated with a particular contact that corresponds to the portion of the utterance; and causing the communication-related voice command to be performed using the data.

9. The method of claim 8, comprising:

comparing the transcription of the utterance to one or more rules, each rule associated with a particular communication-related voice command;

in response to comparing the transcription of the utterance to the one or more rules, determining that the transcription of the utterance satisfies at least one rule of the one or more rules; and in response to determining that the transcription of the utterance satisfies the at least one rule, determining that the transcription of the utterance likely includes the communication-related voice command.

10. The method of claim 8, comprising:

generating an instruction based on i) at least a portion of the transcription of the utterance and ii) the data associated with the contact; and in response to generating the instruction, causing the communication-related voice command to be performed.

11. The method of claim 8, comprising:

before transmitting the subset of the audio data, applying one or more acoustic processing models to the subset of the audio data.

12. The method of claim 8, comprising:

identifying one or more properties associated with the subset of the audio data; and in response to determining that the transcription of the utterance likely includes the communication-related voice command, transmitting the one or more properties associated with the subset of the audio data.

13. The method of claim 12, comprising:

in response to determining that the transcription of the utterance likely includes the communication-related voice command, transmitting the subset of the audio data.

14. The method of claim 12, wherein the one or more properties associated with the subset of the audio data includes a sequence of phones of the subset of the audio data.

15. The method of claim 12, wherein the one or more properties associated with the subset of the audio data includes language model scores of the subset of the audio data.

16. The method of claim 12, wherein the one or more properties associated with the subset of the audio data includes one or more timestamps of the subset of the audio data.

17. A computer-implemented method comprising:

obtaining audio data corresponding to an utterance;

transmitting the audio data corresponding to the utterance;

receiving an indication that the utterance likely includes a communication-related voice command;

in response to receiving the indication that the utterance likely includes the communication-related voice command, selecting a subset of the audio data that corresponds to a portion of the utterance referencing a contact associated with the communication-related voice command;

applying at least a language model to the subset of the audio data that corresponds to the portion of the utterance referencing a contact to identify data associated with a particular contact that corresponds to the portion of the utterance; and transmitting the data associated with the particular contact.

18. The method of claim 17, comprising:

storing at least a portion of the audio data; and generating the subset of the audio data based on the stored portion of the audio data.

19. The method of claim 18, comprising:

before applying the at least the language model to the subset of the audio data corresponding to the portion of the utterance, applying an acoustic model to the stored portion of the audio data.

20. The method of claim 17, comprising:

receiving the subset of the audio data corresponding to the portion of the utterance, wherein the subset of the audio data includes a processed portion of the audio data.

21. The method of claim 17, comprising:

receiving the subset of the audio data corresponding to the portion of the utterance, wherein the subset of the audio data includes a sequence of phones; and in response to receiving the indication that the utterance likely includes the communication-related voice command, applying the at least a language model to the sequence of phones to identify the data associated with the particular contact.

22. The method of claim 17, comprising:

receiving the subset of the audio data corresponding to the portion of the utterance, wherein the subset of the audio data includes acoustic model scores; and in response to receiving the indication that the utterance likely includes the communication-related voice command, applying the at least a language model to the acoustic model scores to identify the data associated with the particular contact.

23. The method of claim 17, wherein selecting a subset of the audio data that corresponds to a portion of the utterance referencing a contact associated with the communication-related voice command comprises:

extracting a portion of the audio data corresponding to one or more timestamps included with the audio data; and in response to receiving the indication that the utterance likely includes the communication-related voice command, applying the at least a language model to the extracted portion of the audio data to identify the data associated with the particular contact.

* * * * *